United States Patent [19]
Kramer

[11] Patent Number: 5,314,372
[45] Date of Patent: May 24, 1994

[54] SIMULATED ENGINE WITH SOUND GENERATOR

[76] Inventor: Fred J. Kramer, P.O. Box 865, Corning, Calif. 96021

[21] Appl. No.: 44,694

[22] Filed: Apr. 12, 1993

[51] Int. Cl.⁵ .................. A63H 5/00; A63H 17/28; B60K 1/00; B62D 61/02
[52] U.S. Cl. .................. 446/404; 446/409; 446/438; 280/288.4; 180/65.4; 180/221
[58] Field of Search .......... 280/288.4; 180/65.1, 180/65.4, 65.3, 221; 446/404, 397, 408, 409, 410, 414, 417, 418, 438, 439, 440, 485, 175, 219

[56] References Cited

U.S. PATENT DOCUMENTS

| | | | |
|---|---|---|---|
| 3,029,553 | 4/1962 | Clemens | 446/404 |
| 3,121,293 | 2/1964 | Sperry et al. | 446/404 X |
| 3,165,860 | 1/1965 | Glass et al. | 446/414 |
| 3,425,156 | 2/1969 | Field | 446/409 |
| 3,884,317 | 5/1975 | Kinzel | 180/65.3 X |
| 4,516,647 | 5/1985 | Novak | 180/65.3 X |
| 4,735,592 | 4/1988 | Griffin | 446/404 |
| 4,875,885 | 10/1989 | Johnson | 446/404 X |
| 4,932,913 | 6/1990 | Raviv et al. | 446/404 X |
| 5,045,016 | 9/1991 | Stern et al. | 446/409 |
| 5,195,920 | 3/1993 | Collier | 446/409 |

FOREIGN PATENT DOCUMENTS

| | | | |
|---|---|---|---|
| 2654861 | 5/1991 | France | 446/409 |
| 1010685 | 11/1965 | United Kingdom | 446/418 |

OTHER PUBLICATIONS

Texas Instruments, Complex Sound Generator SN 76477 Jul. 1978.

Primary Examiner—Robert A. Hafer
Assistant Examiner—D. Neal Muir

[57] ABSTRACT

A battery and generator operated electro-mechanical device looks like an engine and emits engine sounds. The engine attaches to a bicycle frame giving the bicycle the appearance of being a motor bike. The engine makes an authentic idle sound when first started up and sounds like an engine accelerating to full throttle as the bike is pedalled. In a second embodiment, a fully mechanical engine sound is produced whenever the bike is in motion. Both embodiments are housed in an authentic looking engine housing.

4 Claims, 9 Drawing Sheets

5,314,372

SIMULATED ENGINE WITH SOUND GENERATOR

BACKGROUND OF THE INVENTION

1. Field of the Invention

This invention relates to simulated engines that appear realistic and are capable of producing authentic engine sounds. The present invention is particularly directed towards a toy motor attachable to a bicycle frame giving the bicycle the appearance of having a motor. The present invention is provided with electro-mechanical circuitry capable of reproducing various controllable engine sounds.

2. Description of the Prior Art

A variety of audible devices and engine appearing toys are seen in the past art shown in several patents. Some make weapon sounds. Other devices are simply crude reproductions of motor types. A few produce a motor sound through the use of mechanical noise-makers. There are devices that place a reed in the spokes of a bicycle and others that are frictional against a bicycle tire to make engine-like sounds. None of the motor-like toys and simulations seen in the past art and in the market place provide the sophisticated appearance and the controllable motor sounds generated by the present invention.

SUMMARY OF THE INVENTION

Therefore, in practicing my invention, I provide a realistic engine shell that can be attached to the frame of a bicycle to make the existing bicycle appear to be a motor bike. The engine of the present invention is a battery and generator operated electro-mechanical device that when switched on produces an authentic idle sound and sounds like an engine accelerating up to full throttle as the bike is pedalled, the sound being governed by pedalling the bicycle.

DESCRIPTION OF THE PREFERRED EMBODIMENT

Figure 1:
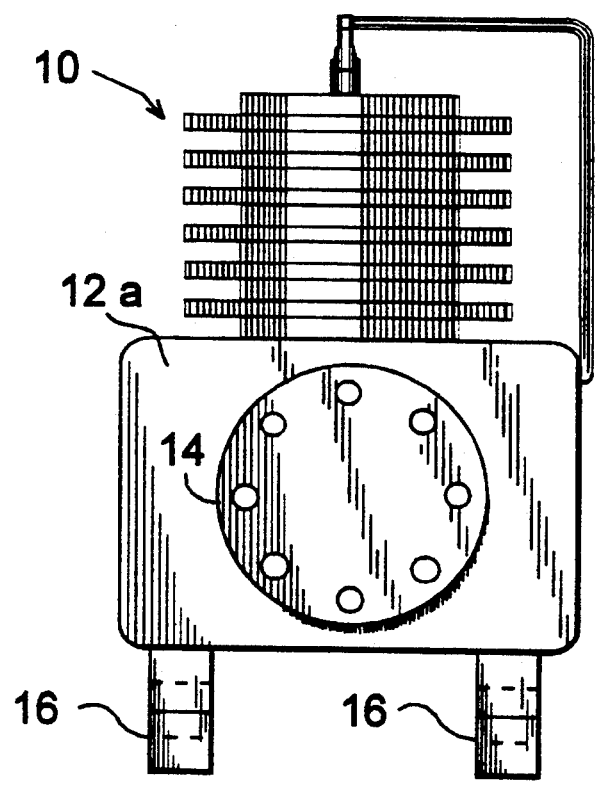
FIG. 1 shows a simulated engine according to the invention in a elevated view from the front side. Brackets for attaching the simulated engine to a bike frame are on the bottom of the engine in the FIG. 1 view.
Figure 2:
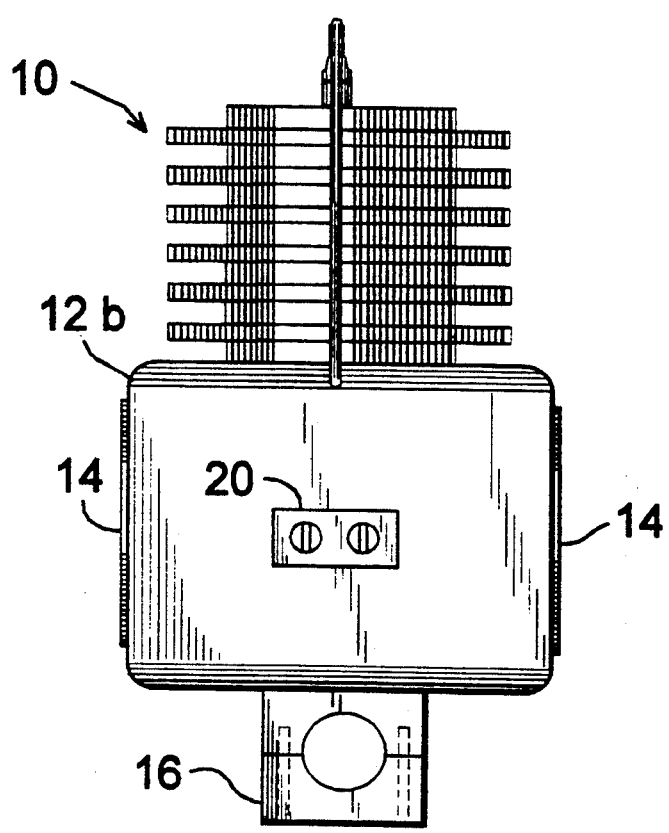
FIG. 2 shows the simulated engine of FIG. 1 in a elevation view from the side that would be positioned downward when the engine is attached to a bicycle frame.
Figure 5:
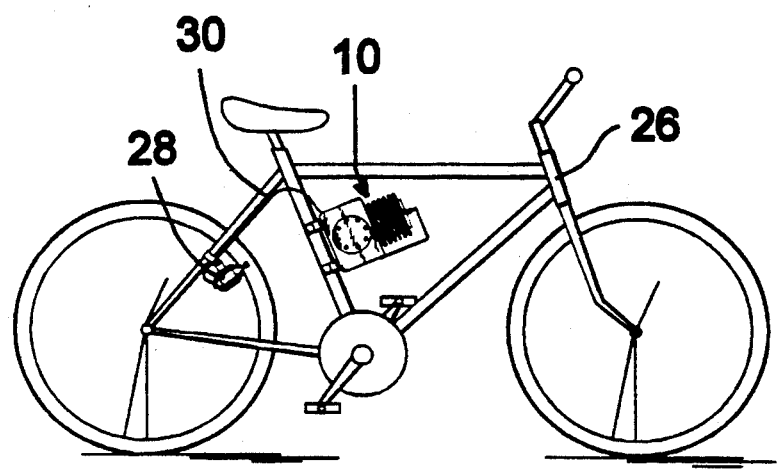
FIG. 5 shows the simulated engine according to the invention attached to the frame of a mountain bike.
Figure 6:
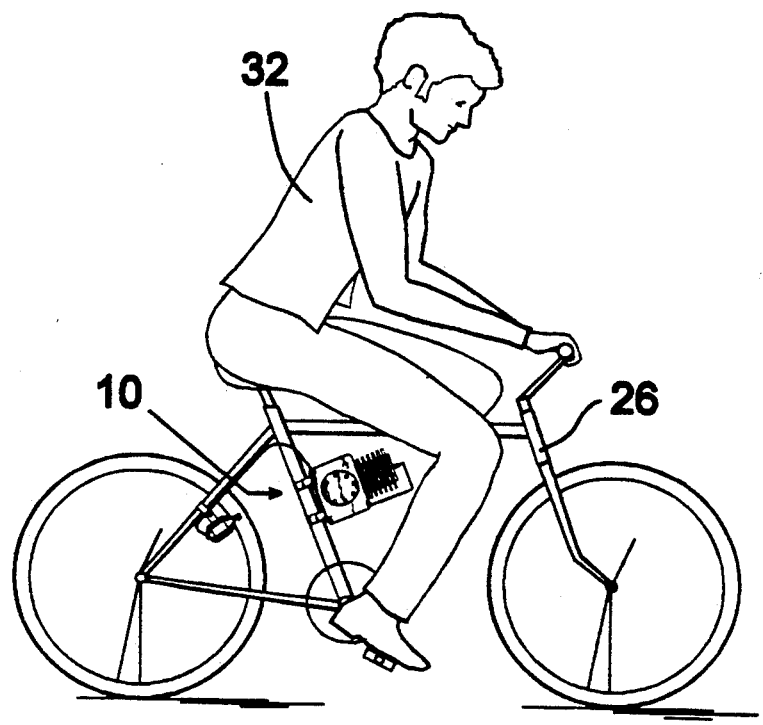
FIG. 6 shows a rider riding a bicycle equipped with the simulated engine of the present invention.

Referring now to the drawings where the present invention is indicated as simulated engine 10. Simulated engine 10 is molded in a single unit including a sparkplug, a cylinder, and a crankcase. The drawing in FIG. 1 shows simulated engine 10 in a view of the front side 12. Speaker grille 14 can be seen in the crankcase area of engine front side 12. Brackets 16 for attaching simulated engine 10 to the frame of a bicycle 26 (see FIG. 5) are on the bottom of the simulated engine 10. In FIG. 2 simulated engine 10 is shown in a side view 18 showing the side that would be positioned downward when simulated engine 10 is attached to the frame of bicycle 26, FIG. 5. In the FIG. 2 view, the binding posts 20, for attachment of generator wiring 30 can be seen. Generator wiring 30 and 6 volt generator 28, driven by the rear tire of bicycle 26, are seen in FIG. 5.

Figure 3:
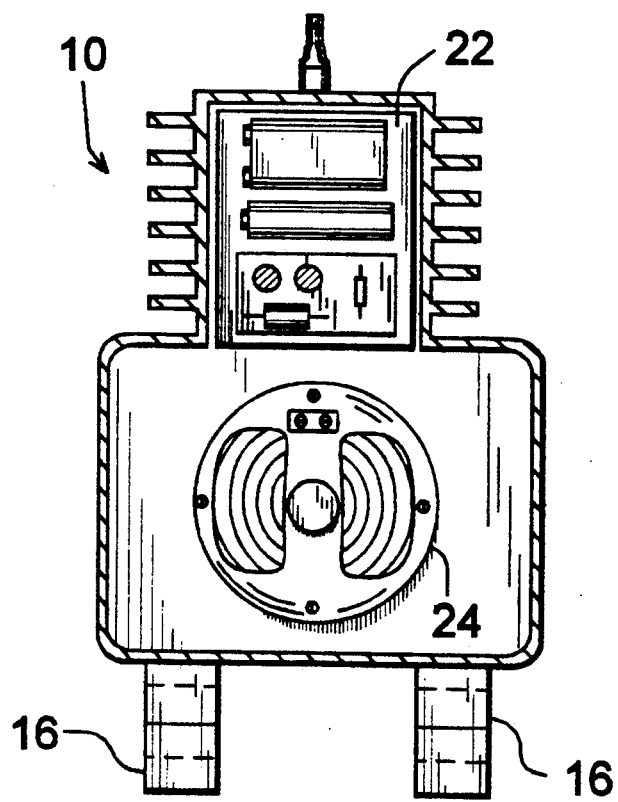
FIG. 3 shows the simulated engine of the present invention in an opened view showing the chassis including the batteries and the electronics board. The speaker is shown below the electronics board in the simulated crankcase. The bicycle frame attachment brackets are seen on the bottom surface of the simulated crankcase.

The inside of simulated engine 10 can be seen in FIG. 3. The electronics board and batteries on chassis 22 can be seen in the cylinder area of simulated engine 10 and loudspeaker 24 can be seen in the crankcase area of simulated engine 10. Brackets 16 are affixed to the outside bottom surface of the crankcase area of simulated engine 10.

Figure 4:
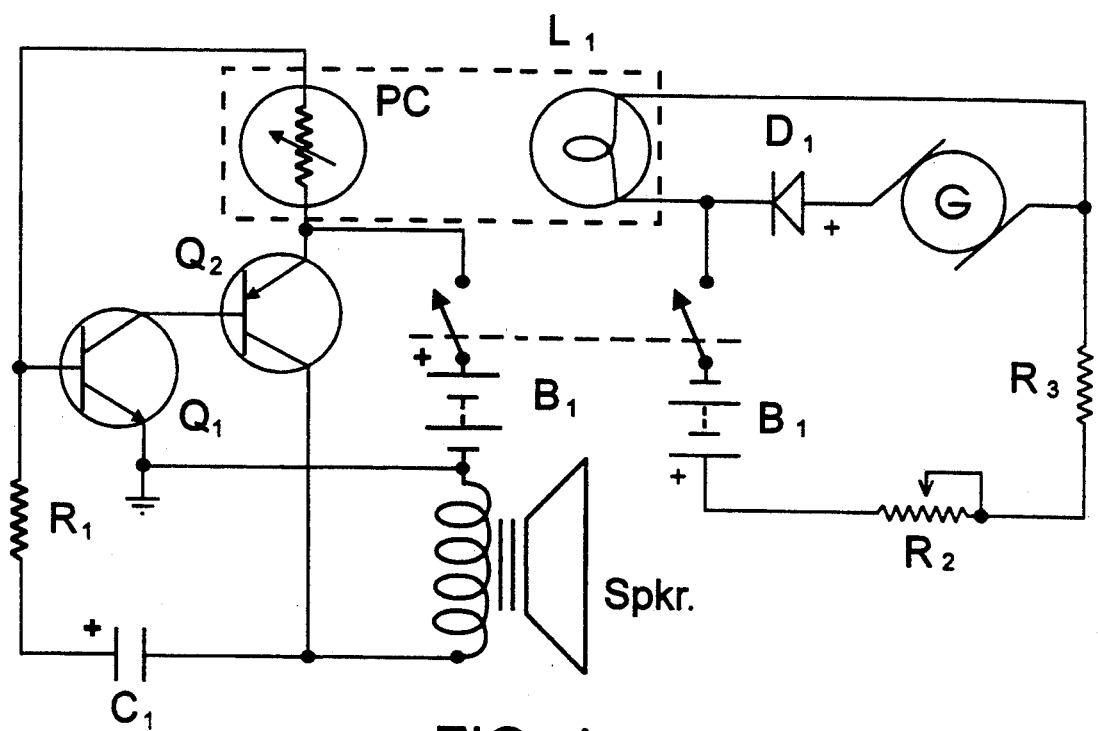
FIG. 4 shows a schematic diagram of the electronics that operates to produce engine sound effects with a listing of electronic components.

FIG. 4 shows a schematic diagram of the electronics of simulated engine 10 and a listing of the components that produce the engine sounds. The rectangular area of dotted lines in the schematic diagram indicates the location of two very essential parts, the Photocell (PC) and the 6 volt light bulb (L1) housed in a container that is sealed to ambient light.

The individual element of the driving circuit are listed below;

B1—9 volt Battery
B2—3 volt Battery
C1—6.8 MFD Tantalum Capacitor, 6 volt
D1—Rectifier Diode
G—6 volt Bike Generator
L1—6 volt Incandescent Bulb
PC—Photocell, 500 Ohm light resistance, 2.5K dark
Q1—NPN Transistor
Q2—PNP Transistor
R1—15 Ohm, ½ watt Resistor
R2—50 Ohm wire wound Potentiometer, 2 watt
R3—10-100 Ohm Resistor, ½ watt When the user switches on the apparatus an authentic engine idle sound is heard produced by a battery powered audio oscillator/amplifier connected to a loudspeaker. A standard 6 volt bike generator is used to modulate the output of the audio oscillator/amplifier via a specially constructed transducer, (PC and L1 in a light-proof container). As the cyclist begins to pedal the bike, the generator sends an increasing voltage to lightbulb (L1). The increased voltage causes the bulb to glow more brightly lowering the resistance of Photocell (PC) opposite it in the light-proof container. This lower resistance causes the oscillator to speed-up, consequently, the simulated engine appears to accelerate. The process is reversed as the rider deccelerates the bike. The entire apparatus (less bike generator) is designed to mount inside a simulated engine shell attached to the bicycle frame. Also if several parameters of the electronics are changed, one can create the illusion of various kinds of engines. For example: a two cycle engine used on "dirt" bikes.

Figure 7:
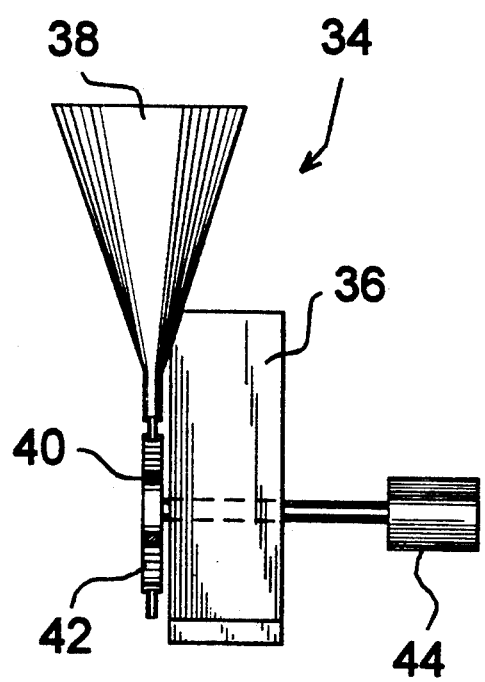
FIGS. 7 and 8 illustrate a totally mechanical engine sound simulator using a megaphone to amplify and disperse the sound created by the teeth of a rotating ratchet striking the end of a megaphone. The ratchet is connected to a friction roller which is driven by contact with the bicycle tire.
Figure 8:
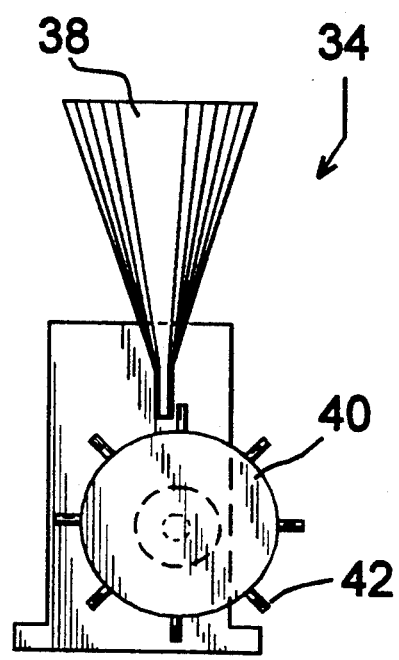

FIGS. 7 and 8 show different views of a mechanical device for producing a simulated engine sound. In FIG. 7 we see a side view 34 of the device. The rotation of ratchet 40 driven by attached friction roller 44 causes the ratchet teeth 42 to repeatedly strike the tip of megaphone 38 producing sound that is amplified and dispersed by the conical nature of the megaphone. The pedesal base 36 also acts as a bearing block for the rotating ratchet. Friction roller 44 is driven by contact with the bike tire. In FIG. 8 we see an end view 46 of the device, better illustrating the ratchet 40.

Figure 9:
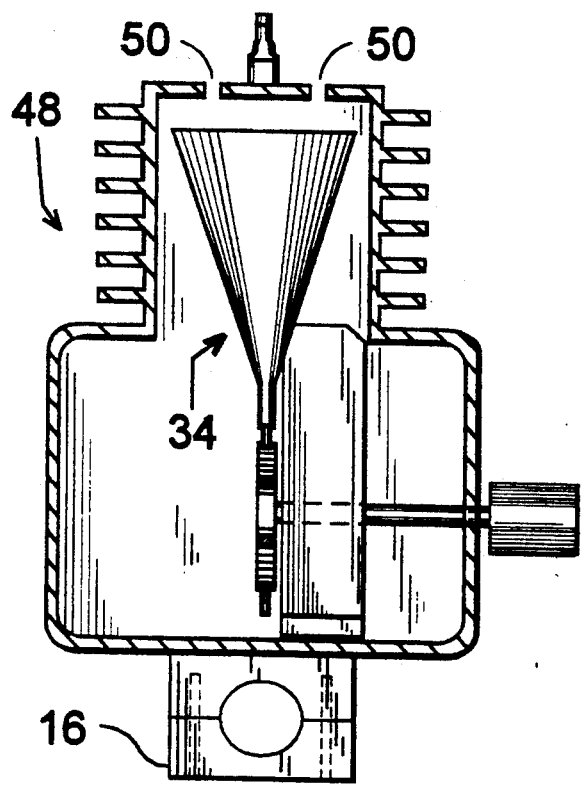
In FIG. 9 the mechanical engine sound simulator shown in FIGS. 7 and 8 is seen installed within a simulated engine shell. The megaphone acts as a mechanical amplifier and also disperses the sound through small holes in the engine cylinder head. As the bicycle is pedalled, the bike tire spins the friction roller attached to the end of the ratchet and the ratchet teeth strike the end of the megaphone producing sound.

FIG. 9 shows an end view of the inside of a simulated engine 48 with mechanical sound device 34, installed. A series of sound openings 50 in the cylinder head can be seen, as can one of the brackets 16 which attaches the device to the bicycle frame.

Even though the embodiments of my invention have been described in extensive detail in the above specification, and are well illustrated in the drawings, it is acknowledged I may practice variations of my invention which do not exceed the scope of my appended claims. Variations of my invention practiced by others and trespassing the scope of the appended claims, will be challenged.

What is claimed is:

1. A toy sound generator to simulate engine sounds for mounting on a bicycle comprising,
    a) a hollow engine shell with mounting means, said mounting means attachable to frame elements of a bicycle,
    b) batteries in circuit with an audio oscillator and a sound transducer, said batteries, oscillator and transducer located in said shell,
    c) circuit modulation means comprising a bike generator driving a light means which drives a photocell, output from said photocell directed to said audio oscillator,
    d) attachment means to connect said generator to said light means,
    e) said audio oscillator comprising a resistor-capacitor network providing sound signals to said sound transducer, said oscillator modulated by said bike generator as that bicycle said sound generator is mounted upon is caused to move by a user.

2. The toy sound generator of claim 1 where sound transducer is a loudspeaker in registration with openings in said shell.

3. The toy sound generator of claim 1 wherein said audio oscillator comprises an integrated circuit member with a plurality of engine sound signals stored therein.

4. The toy sound generator of claim 1 wherein said bike generator is a low voltage generator driven by contact with a moving portion of a bicycle wheel.

* * * * *